United States Patent [19]
Konishi et al.

[11] Patent Number: 4,803,574
[45] Date of Patent: Feb. 7, 1989

[54] ARRANGEMENT OF RECORDING AND/OR REPRODUCING APPARATUS

[75] Inventors: Akio Konishi; Satoshi Kikuya; Osamu Zaitsu; Hideaki Yoshio, all of Osaka, Japan

[73] Assignee: Matsushita Electric Industrial Co., Ltd., Osaka, Japan

[21] Appl. No.: 10,958

[22] Filed: Feb. 2, 1987

[30] Foreign Application Priority Data

Feb. 3, 1986 [JP] Japan .................................. 61-21437
Sep. 5, 1986 [JP] Japan ................................ 61-209866
Nov. 5, 1986 [JP] Japan ................................ 61-263395

[51] Int. Cl.$^4$ ............................................ G11B 5/027
[52] U.S. Cl. ...................................... 360/85; 360/96.5
[58] Field of Search ................................. 360/85, 96.5

[56] References Cited
FOREIGN PATENT DOCUMENTS 59-107446  6/1984  Japan .

Primary Examiner—A. J. Heinz
Attorney, Agent, or Firm—Lowe, Price, LeBlanc, Becker & Shur

[57] ABSTRACT

A recording/reproducing apparatus comprising a tape winding device rotationally moving around a tape guide drum for pulling out a tape from a tape cassette and for wrapping the pulled-out tape on the tape guide drum. The tape guide drum advances into an opening portion of the tape cassette on tape loading, resulting in producing a moving space of the tape winding device, and the tape winding device is rotationally moved around the tape guide drum in the produced space between the tape guide drum and the casing section in response to the advancing movement of the tape guide drum. A casing section of the recording/reproducing apparatus and a member operatively associated with the casing section may either enter into the locus of the rotational movement of the tape winding device after the tape winding device is rotationally moved by a predetermined angle.

10 Claims, 11 Drawing Sheets

ARRANGEMENT OF RECORDING AND/OR REPRODUCING APPARATUS

BACKGROUND OF THE INVENTION

The present invention relates generally to an arrangement of recording and/or reproducing apparatus, such as video tape recorders and rotational head type digital audio tape recorder, in which information signals are recorded or reproduced on or from a tape which is pulled out from a tape cassette and which is wrapped and travelled around a tape guide drum having a transducer for recording and/or reproducing information signals.

An important problem in the recording and reproducing art relates to the need for the portable type recording and/or reproducing apparatus which is small in size in order to provide easy handling and mobility. However, considerable difficulty has been encountered to meet the requirement imposed in small-sized construction because the basic dimension of the recording and/or reproducing apparatus is determined depending upon the diameter of the tape guide drum, the moving range of the tape wrapping device, and size of the tape cassette. One approach involves postioning the tape guide drum as near to the tape cassette as possible, as described in Japanese Patent Provisional No. 59-107446. This technique still does not produce satisfactory results in terms of the size reduction because of the requirement to ensure the moving range of the tape wrapping device.

SUMMARY OF THE INVENTION

It is therefore an object of the present invention to provide a new and improved recording and/or reproducing apparatus which is capable of achieving the size reduction, particularly after tape loading.

In accordance with the present invention, there is provided a recording/reproducing apparatus comprising tape winding means rotationally moving around a tape guide drum for pulling out a tape from a tape cassette and for wrapping the pulled-out tape on the tape guide drum, a casing section of the recording/reproducing apparatus or a member operatively associated with the casing section entering into the locus of the rotational movement of the tape winding means after the tape winding means is rotationally moved by a predetermined angle.

More specifically, the tape guide drum is positioned to face the tape winding means with the tape stretched by a pair of posts of the tape cassette being interposed therebetween and is advanced to an opening portion of the tape cassette on the tape loading. The tape winding means is rotationally moved around the tape guide drum in response to the advancing movement of the tape guide drum. The advancing movement of the tape guide drum produces a moving space of the tape winding means. After the termination of the rotational movement of the tape winding means or after the tape winding means has been rotated by a predetermined angle that the rotational movement of the tape winding means is not interrupted by movement of the casing section or the operatively associated member toward the tape cassette, the casing section is moved to enter into the space (locus) of rotational movement of the tape winding means around the tape guide drum. This results in size reduction of the recording/reproducing apparatus irrespective of the dimension of the rotationally moving locus of the tape winding means.

In the case that the tape guide drum is designed not to be advanced toward the tape cassette, the casing section may be moved in the separating direction from the tape cassette during tape loading operation performed by the tape winding means in order to form a space for the rotational movement of the tape winding means, and then returns to the original position, i.e., into the locus of rotational movement of the tape winding means, in response to the termination of the rotational movement of the tape winding means or after the tape winding means has been rotationally moved by a predetermined angle.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
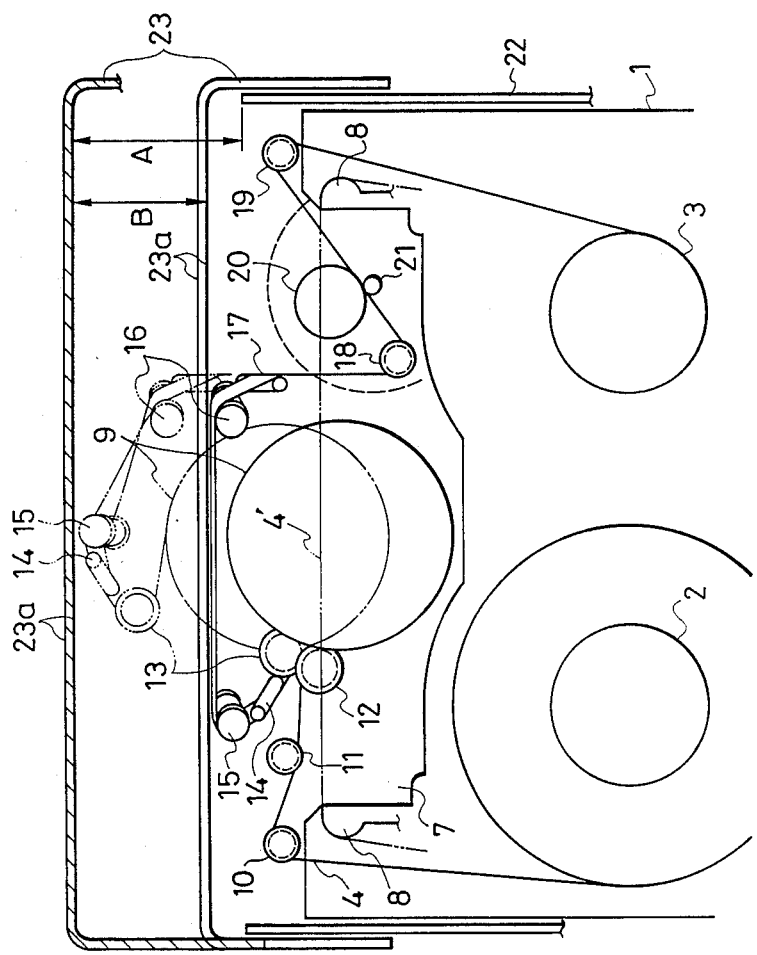
FIG. 1 is a plan view showing a recording/reproducing apparatus according to a first embodiment of the present invention.
Figure 2:
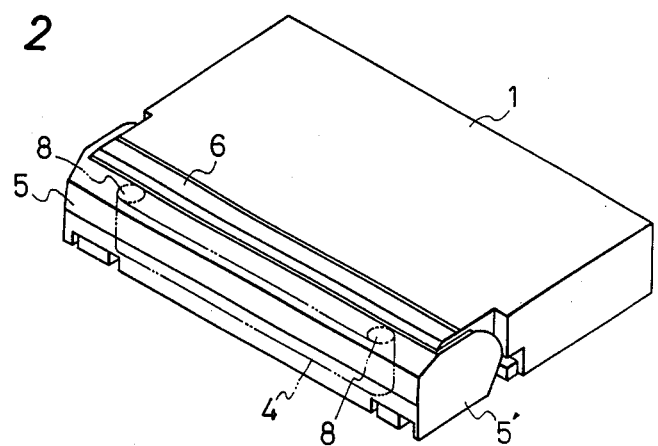
FIGS. 2 to 4 are illustrations of a tape cassette employed for embodiments of the present invention.
Figure 3:
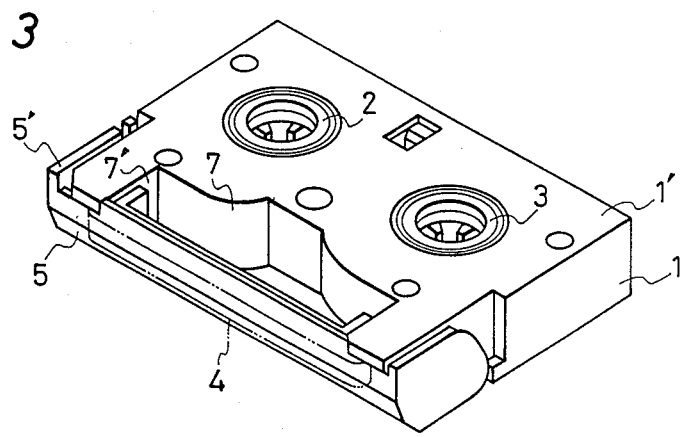
Figure 4:
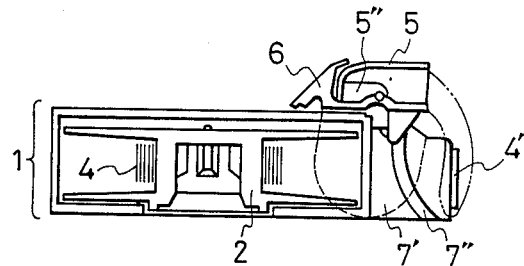

Referring now to FIG. 1, there is schematically illustrated a recording and/or reproducing apparatus according to an embodiment of the present invention. FIGS. 2 to 4 show a tape cassette used for the recording and/or reproducing apparatus of this embodiment. Of these drawings, FIG. 2 is a perspective diagram of the tape cassette viewed from the upper side. A tape 4 encased in the tape cassette 1 is at both the ends wound around a set of a supply reel 2 and a take-up reel 3 (which are illustrated in FIG. 3), and as indicated by a dashed line in the figure the tape 4 is supported by a pair of cassette posts 8 so that a portion thereof is stretched to the front side in parallel to the longitudinal direction of the tape cassette. The stretched portion 4' of the tape 4 is covered from the front and rear sides by the rotational movements of a front cover 5 and a rear cover 6 when the tape cassette is not in the used condition. FIG. 3 is a perspective view of the tape cassette 1 which is turned by 180 degrees from the position of FIG. 2. At the lower surface 1' of the tape cassette 1, an aperture section 7 is provided so that posts or the like are inserted to pull out the tape 4' from the tape cassette 1. When the tape cassette 1 is incorporated into the apparatus according to the embodiment of the present invention, in response to the mounting operation of the tape cassette on the apparatus, a cover opening means (not shown) comes into contact with the side portion 5' of the front cover 5 which is in turn rotated and opened as shown in FIG. 4 which is a side cross-sectional view thereof. The rear cover 6 is supported by a fulcrum supporting portion 5" provided at a portion of the front cover 5, and one end thereof is guided and rotated along a cam guide grooves 7" provided at the side surfaces 7' of the aperture section 7. As a result of the rotation, the rear cover 6 is opened along a predetermined locus indicated by a dashed line in FIG. 4 without coming into contact with the tape 4' to be stretched. In the opened conditions of the front and rear covers 5 and 6, as shown in FIG. 4, they are opened totally up to the height approximately corresponding to the thickness of the tape cassette 1 so as to allow posts and so on or a tape guide drum 9 (FIG. 1) to enter into the apertire section 7.

Figure 5:
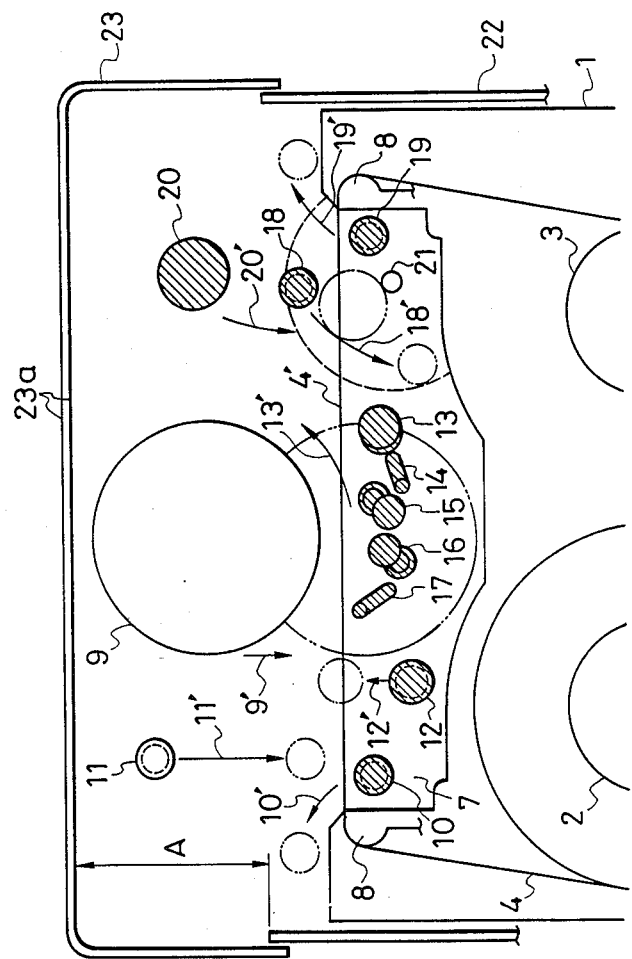
FIG. 5 is a plan view schematically showing the state that the tape cassette is mounted on the recording/reproducing apparatus according to the first embodiment.
Figure 6:
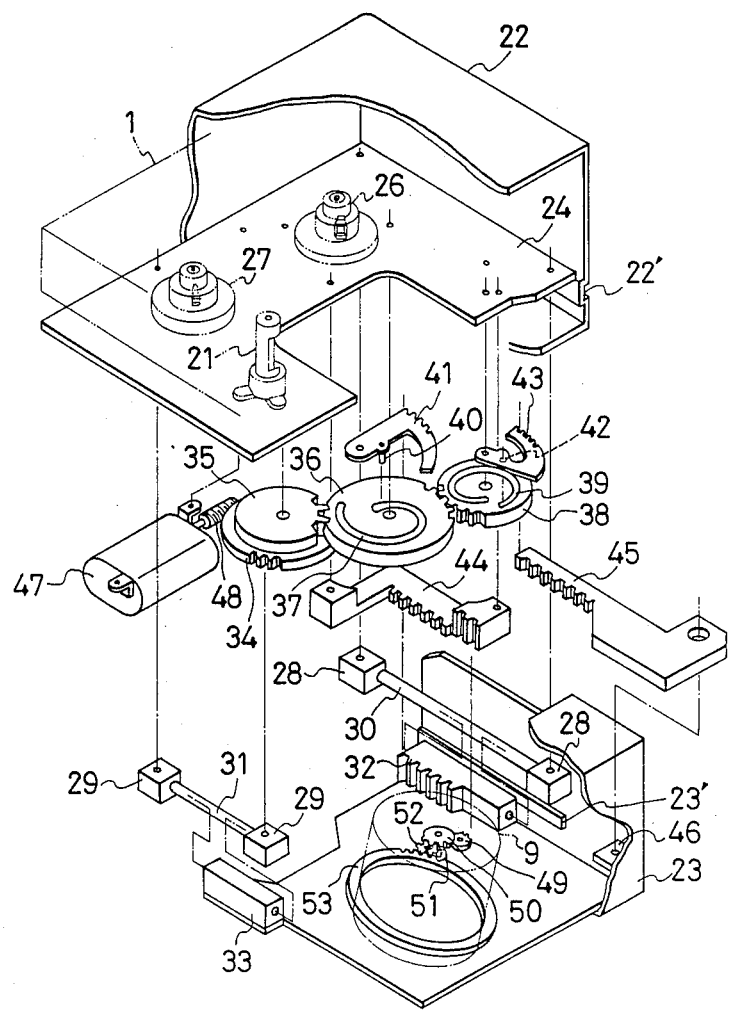
FIG. 6 is a perspective exploded view showing parts of the recording/reproducing apparatus.

The basic operation of the apparatus of this embodiment made in response to installation of the tape cassette 1 will be hereinbelow described with reference to FIGS. 1 and 5. FIG. 5 is a plan view schematically showing the state that the tape cassette 1 is installed in the apparatus. In response to the front and rear convers 5 and 6 being opened as shown in FIG. 4, a tension post 10, posts 12, 13, 14, 15, 16, 17, 19 and a capstan 21 are inserted into the opening section 7 provided at the inside of the tape 4' stretched toward the front face of the tape cassette 1 by the pair of cassette posts 8. On the other hand, a tape guide drum 9, posts 11, 18 and a pinch roller 20 are positioned at the side opposed to the aperture section 7 with respect to the tape 4' stretched to the front face thereof. A first casing section 22 coupled to a cassette base plate 24 (which is illustrated in FIG. 6) on which the tape cassette 1 is mounted is positioned remotely by A in FIGS. relative to a second casing section 23 coupled to a drum base plate 25 (which is illustrated in FIG. 6) on which the tape guide drum 9 is mounted.

Thereafter, the tension post 10, the posts 11, 12, 18, 19 and the pinch roller 20 are respectively started to be moved in the directions indicated by arrows 10', 11', 12', 18', 19' 20' toward positions indicated by dashed lines in FIG. 5. At the same time, the tape guide drum 9 is also moved in the direction of an arrow 9'. The posts 13, 14, 15 which mainly functions as a tape winding means for pulling out the tape 4 and which are rotated around the tape guide drum 9 are rotationally moved in the direction of an arrow 13' together with the posts 16, 17. While the tape guide drum 9 exceeds the stretched position of the tape 4 and enters into the aperture section 7 up to a position indicated by a dashed line in FIG. 5, the position relation between the first and second casing sections 22 and 23 is maintained to be positioned remotely by A from each other. When the tape guide drum 9 reaches a position indicated by a dashed line in FIG. 1, the posts 13, 14, 15 are respectively rotationally moved around the tape guide drum to draw a predetermined locus in a space between the tape guide drum 9 and the second casing section 23 which is formed as a result of the movement of the tape guide drum 9. On the other hand, the posts 16, 17 are stopped at predetermined positions with respect to the tape guide drum 9. Consequently, as indicated by a solid line in FIG. 1, the tape path of the tape 4 from the supply reel 2 to the take-up reel 3 is formed by the posts 10 to 19 and the tape guide drum 9. On the other hand, until the posts 13, 14, 15, which act as mainly a tape winding means, are rotationally moved up to a predetermined angle around the tape guide drum 9, at least the second casing section 23 is maintained to be relatively spaced by A from the first casing section 22. However, after the termination of the rotational movements of the posts 13, 14, 15 or after the tape winding means has been rotationally moved by a predetermined angle to the position that the movement of the second casing section 23 does not interrupt the rotational movements of the posts 13, 14, 15, the distance between the first and second casing sections 22 and 23 is shortened by the amount indicated by character B in FIG. 1, that is, they are nearer to each other, and therefore, the second casing section 23 enters within the loci of the rotational movement of the posts 13, 14, 15 positioned around the tape guide drum 9. As a result, the size of the entire apparatus is made small irrespective of the area of the locus of the rotational movement of the tape winding means.

In this case, it is not always required that the second casing section 23 itself enters into the locus of the rotational movement thereof. That is, the purpose can be achieved even if it is arranged such that only members operatively associated with the second casing section 23, such as electric parts and supporting members, enter thereinto.

A description in terms of the detailed arrangement of the apparatus shown in FIGS. 1 and 5 will be hereinbelow made with reference to FIGS. 6 to 11. Here, the movements of the tension post 10, the posts 12, 18, 19 and the pinch roller 20 can be easily realized in accordance with known techniques, for example, wherein they are moved by the rotation of a rotating lever (not shown) or the post 11 is fixedly mounted on the drum base plate 25 (FIG. 8), and therefore the description will be made in terms of only the portions relating to the present invention.

Figure 7:
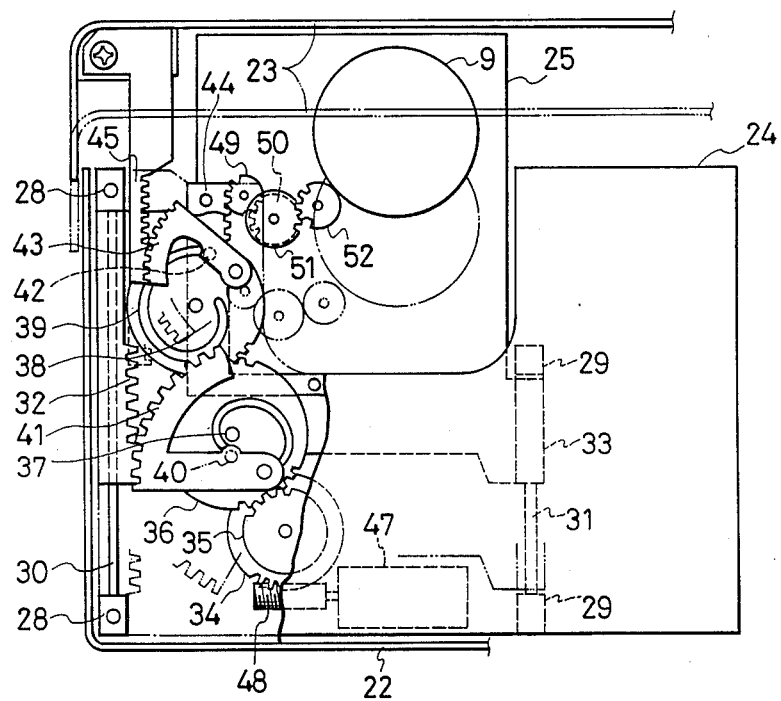
FIG. 7 is a plan view showing the main portion of the recording/reproducing apparatus.

FIGS. 6 and 7 show an arrangement for performing, with a predetermined timing difference, the relative movement between the cassette base plate 24 which functions as a cassette placing section for mainly placing the tape cassette 1 and the drum base plate 25 which acts as a drum placing section for mainly placing the tape guide drum 9 and the relative movement between the first casing section 22 associated with the cassette placing section and the second casing section 23 associated with the drum placing section. Of these, FIG. 6 is a perspective exploded view showing arranging parts and FIG. 7 is a plan view of the arrangement.

In FIGS. 6 and 7, on the cassette base plate 24 there are mounted the tape cassette 1 and further parts such as a supply reel base 26, a take-up reel base 27 and the capstan 21 for travelling and driving the tape 4 which is encased in the tape cassette 1. The first casing section 22 for mainly covering the parts for the travelling and driving of the tape 4 is directly or indirectly coupled to the cassette base plate 24. On the other hand, on the drum base plate 25 there are mounted the tape winding means comprising the tape guide drum 9, posts 13 to 17, a loading ring 59 and so on, which is movable relative to the second casing section 23 for covering them. Concave portions 22' of the first casing section 22 and convex portions 23' of the second casing section 23 are engaged with each other so that a casing section guiding means is formed to ensure the relative movement of the first and second casing sections. Further, to the cassette base plate 24 are respectively attached guide shafts 30 and 31 fixedly held by shaft holders 28 and 29, and the guide shafts 30 and 31 are inserted into sliders 32 and 33 secured to the drum base plate 25 to be slidably supported, whereby the cassette base plate 24 and the drum base plate 25 are relatively movable to each other in predetermined directions. Between the cassette base plate 24 and the drum base plate 25 and at the back surface of the cassette base plate 24 there are rotatably provided a spur gear 35 integrally attached to a worm gear portion 34, a first cam gear 36 engaged with the spur gear 35 and having a first cam groove 37, a second cam gear 38 engaged with the first cam gear 36 and having a second cam groove 39, and first and second partially toothed gears 41 and 43 positioned so as to engage their engaging pins 40 and 42 with the first and second cam grooves 37 and 39. Further, to the cassette base plate 24 is secured a loading rack 44 so as to be positioned at the lower portion of the first cam gear 36, and a motor 47 is secured to the cassette base plate 24 so as not to affect the drum base plate 25 in its thickness direction. To the motor 47 is attached a worm 48 which is geared to the worm gear 34. The first partially toothed gear 41 is geared to the rack portion of the slider 32 secured to the drum base plate 25, and the second partially toothed gear 43 is fitted with a fitting portion of the second casing section 23 and is geared to a casing rack 45 positioned between the cassette base plate 24 and the drum base plate 25. Therefore, the engagement between the second partially toothed gear 43 and the casing rack 45 in the longitudinal direction of the casing rack 45 is maintained even if the slippage between the gear portions thereof occurs in their tooth-width directions and tooth-height directions. The loading rack 44 secured to the cassette base plate 24 is geared to a pinion gear 49 supported by the drum base plate 25, and the rotation of the pinion gear 49 is transmitted through gears 50, 51, integrally attached to each other and similarly supported by the drum base plate 25, and a gear 52 to a loading gear 53 rotating around the tape guide drum 9.

The operation of the above arrangement will be described with reference to FIG. 7.

When the tape cassette 1 is set on the cassette base plate 24, the tape guide drum 9, cassette base plate 24, drum base plate 25, first casing section 22 and second casing section 23 are respectively positioned as indicated by solid lines. Thereafter, in response to supply of power to the motor 47, the worm 48 is rotated and the rotation thereof is transmitted through the worm gear 34 and spur gear 35 to the first cam gear 36 which is in turn rotated counterclockwise. With the rotation of the first cam gear 36, the first partially toothed gear 41 engaged through the engaging pin 40 with the first cam groove 37 is rotated counterclockwise along the cam configuration of the first cam groove 37, and the rack portion of the slider 32 geared thereto is moved so that the drum base plate 25 which is integrally attached to the slider 32 is guided by the guide shafts 32, 33 and moves in close to the cassette base plate 24. On the other hand, by the approaching operation between the drum base plate 25 and the cassette base plate 24, the relative movement occurs between the loading rack 44 secured to the cassette base plate 24 and the pinion gear 49 provided on the drum base plate 25, resulting in rotation of the loading gear 53 (FIG. 6) and in enabling the winding operation of the tape 4 around the tape guide drum 9 concurrently with the approaching movement between the drum base plate 25 and the cassette base plate 24. On the other hand, even if the second cam gear 38 is rotated clockwise in FIG. 7, the radius of gyration of the second cam groove 39 formed on the second cam gear 38 engaged with the first cam gear 36 is constant without variation at the beginning of the rotation, and therefore the second partially toothed gear 43 engaged through the engaging pin 42 with the second cam gear 38 remains stopped without rotation until they rotate up to the predetermined position that exceeds the positions of the posts 13, 14 and 15 indicated by the solid lines in FIG. 1 and that at least the second casing section 23 does not interrupt the rotational movements thereof. After the tape winding means including the posts 13, 14, 15 is rotated up to a predetermined rotating position including the finally rotating position, the radius of gyration of the second cam groove 39 is decreased with the corresponding timing, and therefore the second partially toothed gear 43 is rotated counterclockwise in FIG. 7 to move the casing rack 45 gear thereto, and as a result the approaching movement between the first casing section 22 and the second casing section 23 is started after the approaching movement between the cassette base plate 24 and the drum base plate 25, and finally the first partially toothed gear 41, slider 32, drum base plate 25, second partially toothed gear 38, casing rack 45, second casing section 23, tape guide drum 9, pinion gear 49, and gears 50, 51, 52 are respectively moved to the positions indicated by dashed lines in FIG. 7. In the case that the starting timing that the second casing section 23 enters into the rotational locus of the tape winding means is set to come after the tape winding means is rotated up to the final rotating position, it may be arranged that the turning radius configuration of the first cam groove 37 is formed so that the first partially toothed gear 41 is stopped after rotated by a predetermined angle, and the approaching and entering movement of the second casing section 23 is performed by the rotation of the second cam gear 38 after the stopping of the first partially toothed gear 41.

Figure 8:
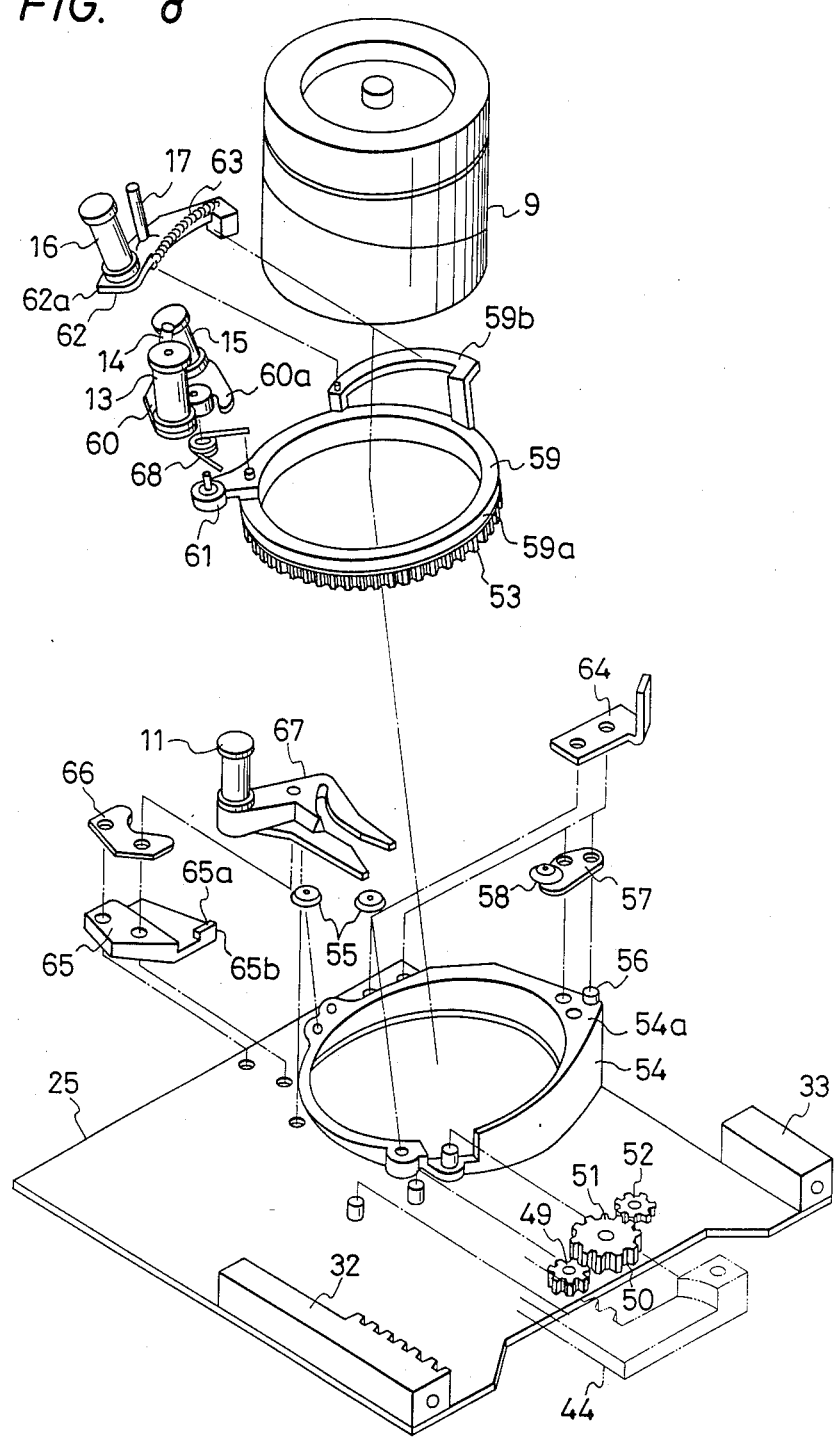
FIG. 8 is an exploded view showing parts mounted on a drum base plate of the recording/reproducing apparatus.
Figure 9:
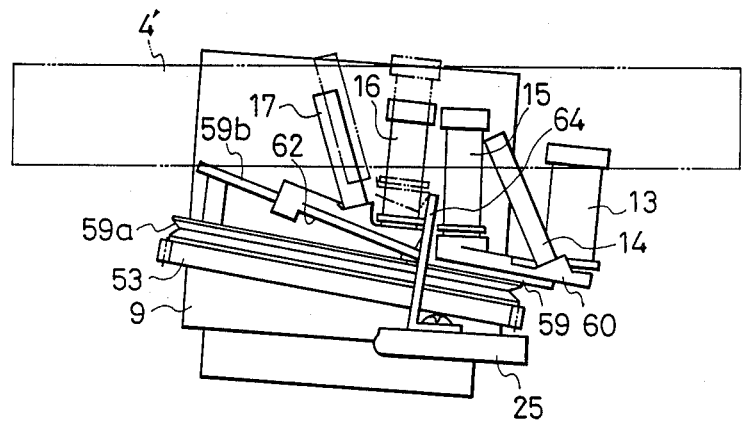
FIG. 9 is a side view showing tape winding means in the middle of the tape winding operation.
Figure 10:
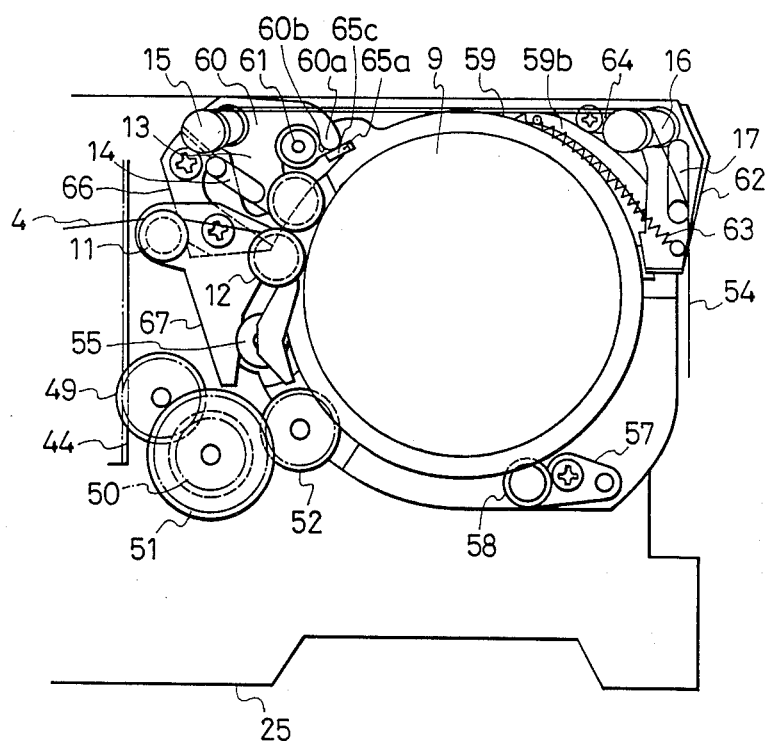
FIG. 10 is a plan view showing the tape winding means on the termination of the tape winding operation.

Secondly, one example of the tape winding means mounted on the drum base plate 25 will be described with reference to FIGS. 8, 9 and 10. Of these drawings, FIG. 8 is an exploded perspective view of parts mounted on the drum base plate 25 and making up it, FIG. 9 is a side view showing the tape winding means in the middle of the winding operation, and FIG. 10 is a plan view showing the tape winding means on the termination of the winding operation. In FIG. 8, a drum holder 54, holding the tape guide drum 9 with respect to the drum base plate with inclination of a predetermined angle, is fixedly secured to the drum base plate 25 and inclined by a predetermined angle with respect thereto in a predetermined direction. On the upper surface 54a of the drum holder 54 are rotatably supported two guide rollers 55, and a roller plate 57 slightly movable about a center pin 56 is provided thereon to rotatably holding a guide roller 58. The three guide rollers 55 and 58 have substantially rhombic configurations, and are provided to the tape guide drum 9 with inclination of a predetermined angle, and is engaged with a V-shaped groove 59a of a loading ring integrally attached to the loading gear 53 to rotatably hold the loading ring 59 and loading gear 53 around the tape guide drum 9. The loading gear 53, as described above, is coupled through the gears 52, 51 and 50 to the pinion gear 49 and rotated in accordance with the movement relative to the loading rack 44.

A main board 60 supporting the posts 14, 15, 16 is provided on the loading ring 59 to be rotatable about a board fulcrum pin 61 thereof and is biased clockwise by a main board spring 68. The loading ring 59 is arranged to slidably rotatably guide, by a subboard guide 59b, a subboard 62 which is positioned at the back of the main board 60 and which supports the posts 16 and 17. The subboard 62 is biased by a subboard spring 63 toward the sides of the main board 60 and loading ring 59. While loading ring 59 is, as shown in FIG. 9, inclined with respect to the drum base plate 25, the inclined direction of the subboard guide 59b is set to merely allow the change of height of the subboard 62 without changing the angle of the subboard 62 with respect to the drum base plate 25 in accordance with the rotation of the loading ring 59. A subboard stopper 64 comes into contact with an end portion 62a of the subboard 62 in the loading step for winding the tape 4 toward the tape guide drum 9, and rotates the subboard 62 changing the height thereof in accordance with the rotation of the subboard guide 59b, and is secured to the drum base plate to perform the positioning thereof. A main board stopper 65, in conjunction with a stopper plate 66, is arranged to position the main board 60 and is secured to the drum base plate 25 together with a post guide 67 for supporting the post 11 and for guiding and positioning the post 12 (FIG. 1).

The winding operation of the tape 4 toward the tape guide drum 9 which is performed with the above-mentioned arrangement will be described hereinbelow.

As described above, the loading ring 59 as well as the loading gear 53 are rotated with the relative movement between the drum base plate 25 and the cassette base plate 24. At the beginning of the rotation, the main board 60 is rotationally biased counterclockwise by a main board spring 68 and the subboard 62 is also biased by the subboard spring 63 in accordance with the movement toward the side of the main board 60 and on the subboard guide 59b, and as shown in FIG. 8 they are started to rotate approaching each other in the aperture section 7 of the tape cassette 1 so that the tape 4' stretched to the front face is pulled out from the tape cassette 1. Thereafter, the end portion 62a of the subboard 62 comes into contact with the subboard stopper 64 to stop the rotation which is being made together with the rotation of the loading ring 59. Furthermore, with the rotation of the loading ring 59, the subboard guide 59a is rotated against the subboard spring 63 to perform the change of height as indicated by two-dott chain line in FIG. 9 to rotationally move to a position shown in FIG. 10. In course of time, although the posts 13, 14, 15 provided on the main board 60 are moved to the positions indicated by dashed lines in FIG. 1, in this embodiment, the drum base plate 25 is approaching the cassette base plate 24 and the approaching movement between the second casing section 23 and the first casing section 22 is not started, resulting in not interruption of the rotations of the loading ring 59 and the posts 13, 14, 15. When the loading ring 59 is further rotated, a protruding portion 60a (FIG. 8) of the main board 60 comes into contact with the right side surface portion 65b of a convex portion 65a provided at one end of the main board stopper 65. Thereafter, when the loading ring 59 is still further rotated, the main board 60 is rotated counterclockwise about the board fulcrum pin 61 against the main board spring 68 and then the protruding portion 60a of the main board 60 is moved from the right side surface 65b of the convex portion 65a of the main board stopper 65 to the upper side surface 65c (FIG. 10). Thereby, main board 60 is rotated above the loading ring 59 and the post 13 approaches the tape guide drum 9 and at the same time the main board 60 is positioned by the main board stopper 65 and the stopper plate 66. On the other hand, the arrangement in terms of the movement of the post 12 is not illustrated because it can be performed in accordance with known techniques. For example, the post 12 provided on a ring arm (not shown) operatively associated with the approaching movement between the drum base plate 25 and the cassette base plate 24 is moved to the position shown in FIG. 10 with it being guided by the post guide 67, and as a result the winding of the tape 4 to the tape guide drum 9 is terminated as shown in FIG. 10. After this or after the loading ring 59 as well as the main board 60 are rotated by a predetermined angle and rotated up to the position not to interrupt the rotation, as described above, the second casing section 23, as illustrated in FIG. 1, enters into the rotation locus made on the rotation of the tape winding means comprising loading ring 59, main board 60, posts 13, 14, 15. Furthermore, on the occasion of releasing the tape 4 from the winding to the tape guide drum 9, it will be obvious to perform the operation opposite to the above-mentioned operation. After the separating movement between the first and second casing sections 22 and 23, the drum base plate 25 will be separated from the cassette base plate 24. The longitudinal direction of the tape 4 stretched in the tape path between the posts 15 and 16 passing between the second casing section 23 and the tape guide drum 9 is substantially parallel to main surfaces 23a of the second casing section 23. The radius of the rotation locus of the portion of the tape winding means opposed to the second casing section 23 when the tape 4 winding operation is substantially terminated is set to be sufficiently smaller than the radius of the rotating locus of the main board 60, the posts 13, 14, 15, that is, the radius of the loading ring 59 is smaller than the maximum radius of locus of the rotational movement of the tape pulling-out device comprising the main board 60 and the posts 13, 14, 15, and therefore the approaching distance (which is indicated by B in FIG. 1) of the second casing section 23 to the tape guide drum 9 becomes greater because the approaching movement of the second casing section 23 is not interrupted thereby. This results in further miniaturizing the whole of the apparatus.

Figure 11:
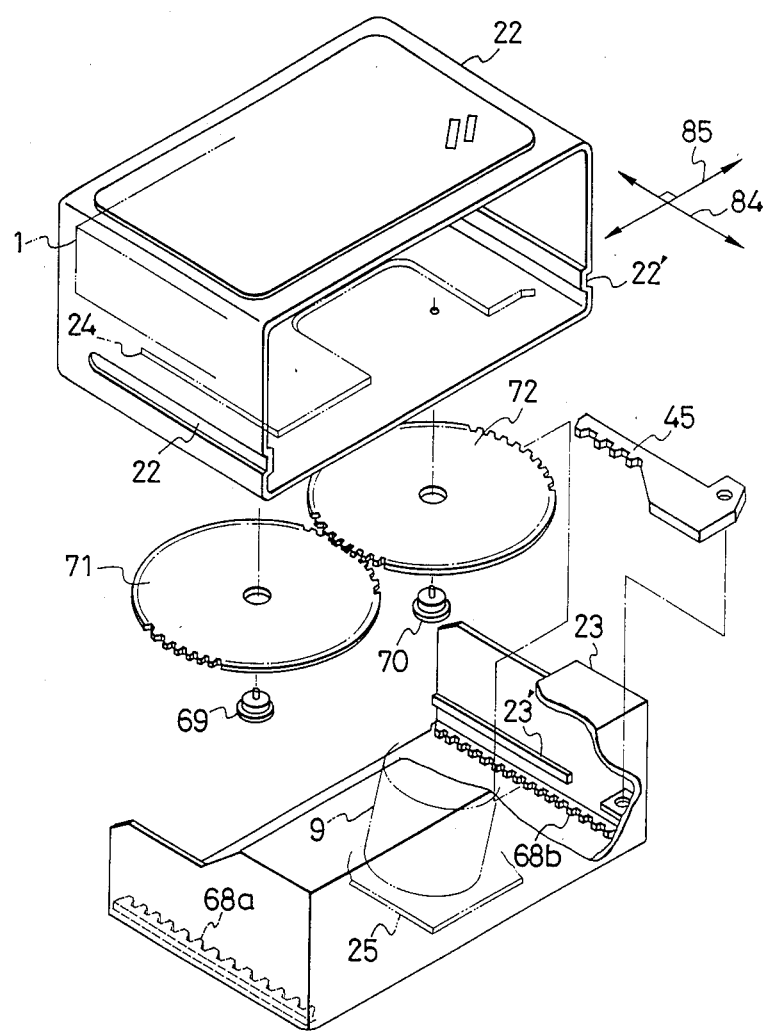
FIG. 11 an illustration for describing the relation between a first casing section and a second casing section.

A relatively moving mechanism of the first casing section 22 and the second casing section 23 will be described hereinbelow with reference to FIG. 11. In FIG. 11, as described above, on the first casing section 22 provided in correspondance with the cassette base plate 24 mounting the tape cassette 1 is provided the concave (recess) portion 22', which is engaged with the convex portion 23' of the second casing section 23 provided in correspondance with the drum base plate 25 mounting the tape guide drum 9 whereby a casing section guide means is made to guide their relatively moving directions. In addition, spur gears 71 and 72 which are rotated in the plane substantially parallel to the bottom surface of the tape cassette 1 mounted on the cassette base plate 24 and which are geared to each other are attached by supporting shafts 69 and 70 to the bottom surface portion of the first casing section 22. On the other hand, at the second casing section 23 are provided moving amount transmitting racks 68a, 68b respectively engaged with the spur gears 71 and 72 at positions on extension of the directions perpendicular to the guiding directions (the directions of an arrow 84 in FIG. 11) of the casing section guided by the casing section guide means, and the spur gears 71, 72 and the moving amount transmitting racks 68a, 68b form a movement transmitting means for transmitting the movement amount between the first and second casing section 22, 23 in the directions of the arrow 84 between positions on extension of an arrow 85. That is, as described above, when the casing rack 45 integrally attached to the second casing section 23 is moved in the directions of the arrow 84, the spur gear 72 is rotated in proportion to the relatively moving amount between the first and second casing sections 22, 23 and at the same time the spur gear 71 geared thereto is also rotated by the same amount and therefore the moving amounts of the first and second casing sections in the directions of the arrow 85 by means of the moving amount transmitting rack 68a geared to the spur gear 71 are coincident with each other, resulting in enabling smooth relative movement without increasing the moving load due to the occurrence of the difference between both the movement amounts.

A second embodiment of the present invention will be described hereinbelow with reference to FIG. 12.

Figure 12:
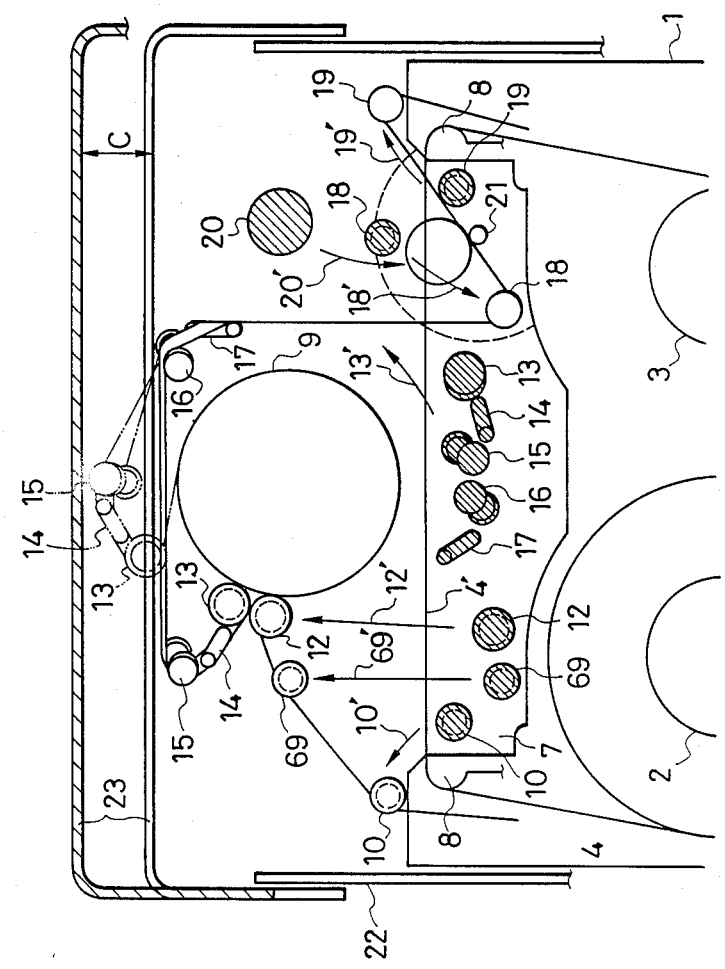
FIG. 12 is a plan view showing a recording/reproducing apparatus according to a second embodiment of the present invention.

Although in the first embodiment the tape guide drum 9 enters into the aperture section 7 of the tape cassette 1 with the drum base plate 25 relatively approaching the cassette base plate 24 to perform the tape loading, in the embodiment of FIG. 12 the tape 4 is wound with the tape guide drum 9 being placed at the position opposed to the aperture section 7 provided at the inside of the tape stretched to the front face of the tape cassette 1 by the pair of posts 8. Parts corresponding to those in FIG. 1 or 5 are marked with the same numerals for better understanding. Furthermore, the movements of the pinch roller 20 and the respective posts, tape winding method and so on are the same as those in the first embodiment and therefore the description thereof are omitted and only a description in terms of the difference therebetween will be made. That is, although in the first embodiment the loading ring 59 is rotated by means of the relative movement between the drum base plate 25 and the cassette base plate 24, it is easily realized in the second embodiment, for example, by means of which the transmission path position to the loading gear 53 (FIG. 8) due to the gear train comprising the pinion gear 49 and the gears 50, 51, 52 in FIG. 7 is located in the vicinity of the first cam gear and the first partially toothed gear is engaged with the pinion gear 49. The illustration is not made because of easy understanding. Furthermore, the movements of the posts 69, 12 can be realized, for example, by mounting them on a link lever (not shown) operatively associated with the rotation of the loading gear 53.

With such an arrangement, as well as the first embodiment, it is operated to pull out the tape 4 and to form the tape path indicated by solid lines through the rotating positions of the posts 13, 14, 15 indicated by dashed lines in FIG. 12. Meanwhile, the loading ring and so on are rotated by a predetermined angle, and after the posts 13, 14, 15 and so on are rotated up to the positions that their rotations are not interrupted by means of the relatively approaching movement between the second casing section 23 and the first casing section 22, the second casing section 23 is moved by an amount indicated by C in the figure in accordance with the same principle as in the first embodiment, resulting in small-sizing the whole apparatus.

Figure 13:
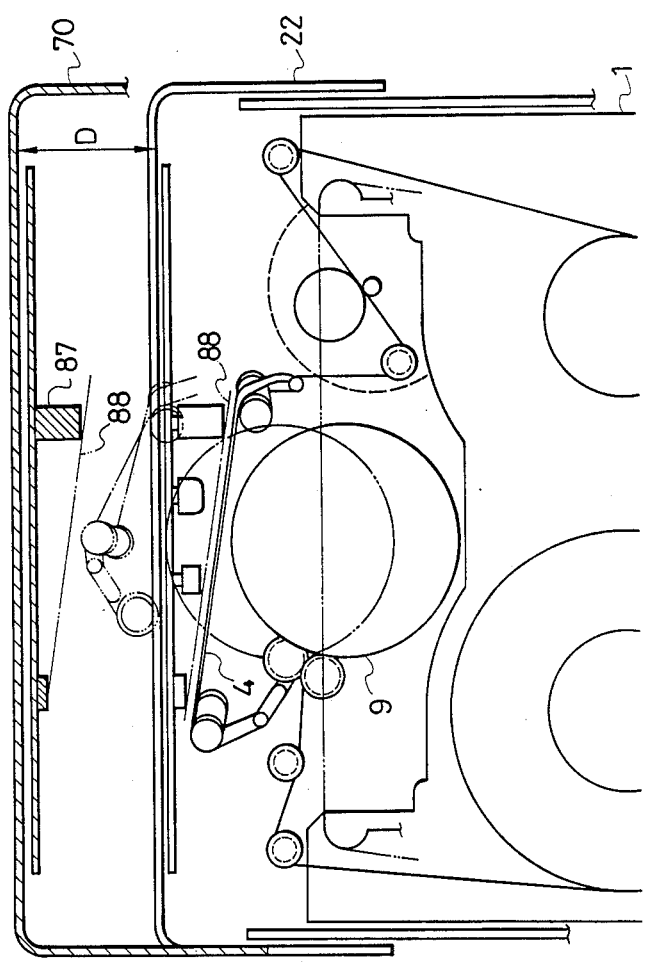
FIG. 13 is an illustration for describing a recording/reproducing apparatus according to third embodiment of the present invention.

Although in the above-mentioned first and second embodiments the casing section enters into the rotating locus of the tape winding means, it is not necessarily limited to inserting the casing section itself thereinto and it is appropriate to insert the electric circuit parts attached to and operatively associated with the casing section thereinto in order to small-sizing the whole of apparatus. Furthermore, it is not always required that the tape 4 stretched between the posts 15 and 16 in the tape path after the winding of the tape 4 indicated by the solid lines in FIGS. 1 and 12 is in parallel to the casing section and as schematically illustrated in FIG. 13 for a third embodiment it can be effectively realized by means of which it is set to be in substantially parallel to the envelope 88 of advancing members such as electric circuit parts operatively associated with the casing section and the second casing section 70 is moved by the amount indicated by D in the figure.

Furthermore, although it has been described that the maximum radius of the rotating locus of the tape winding means depends upon the posts greater than the radius of the loading, even if the maximum rotating radius of the rotating ring such as the loading ring which is parts of the tape winding means is greater than that of the posts, the present invention can be efficiently realized by forming a rotating ring with partially small radius to substantially make small the radius after the termination of the winding.

A fourth embodiment of the present invention will be described hereinbelow with reference to FIGS. 14 and 15 which are schematic plan views.

Figure 14:
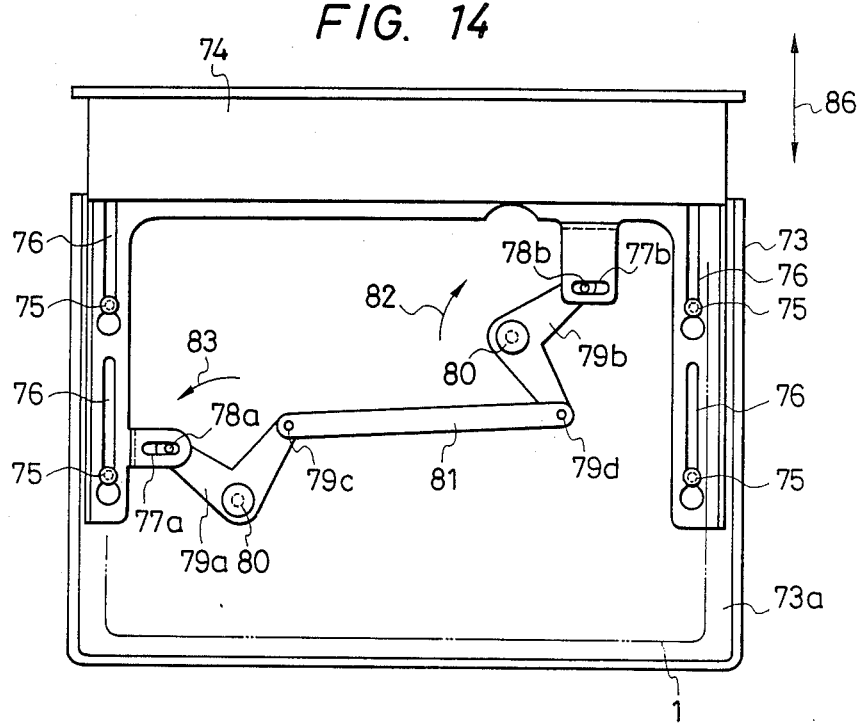
FIGS. 14 and 15 are illustrations for describing an arrangement of a recording/reproducing apparatus according to a fourth embodiment of the present invention.
Figure 15:
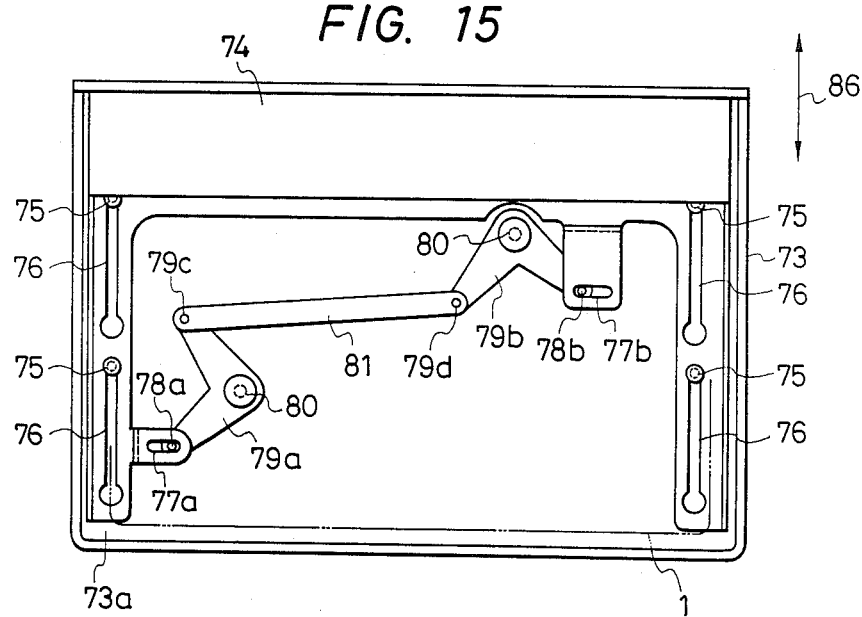

The fourth embodiment realizes the smooth relative movement between first and second casing sections, and FIGS. 14 and 15 respectively show the condition that the first and second casing section 73 and 74 are separated from each other and the condition that they are in close to each other, and, for easy understanding, moving amount transmitting means is mainly illustrated by removing the upper portion of the first casing section 73 and the encased members such as the tape guide drum 9, drum base plate 25, cassette base plate 24 illustrated in FIG. 6 which correspond to the first and second casing section. That is, other parts not illustrated in FIGS. 14 and 15 are similar to those in FIG. 6 and the description thereof will be omitted.

In FIGS. 14 and 15, a casing section guide means of the first and second casing sections 73 and 74 for the approaching and separating in the directions of an arrow 86 in the figure is formed by means of the engagement between a guide shaft 75 provided on the bottom surface portion 73a of the first casing section 73 provided in substantially parallel to the bottom surface 1' (FIG. 3) of the tape cassette 1 mainly mounted in the first casing section 73 and a guide long hole portions 76 respectively provided at the right and left sides of the second casing section 74. On the bottom surface portion 73a of the first casing section 73 is provided a plurality of rotating bodies 79a and 79b supported by a shaft 80 and rotated in a plane substantially parallel to the bottom surface portion 73a, and the transmission of the rotating amount therebetween is performed by a connecting lever 81 rotatably connecting through shafts 79c and 79d. Furthermore, connecting shafts 78a and 78b are provided at end portions of the rotating bodies 79a and 79b and are engaged with long hole portions 77a and 77b of the second casing section 73 at positions on extension of the directions perpendicular to the directions of the arrow 86. Here, care is taken in that the respective dimensions of the positions of the rotating bodies 79a, 79b and the engaging positions with the connecting lever 81 and first casing section 74 are determined so that the moving amounts of the long hole portions 77a, 77b of the first casing section 74 in the directions of the arrow 86, i.e., the moving amounts of the both end portions of the second casing section 74 in the directions of the arrow 86, in accordance with the rotations of the rotating bodies 79a and 79b become equal to each other. In other wards, the lengths of the guide long hole portions 76 are equal to each other.

With above-mentioned arrangement, when the casing rack 45 locked to the second casing section 74 in FIG. 6 is driven in the approaching direction from the condition that the first and second casing sections 73, 74 being separated from each other, the rotating bodies 79a and 79b are respectively simultaneously rotated in the directions of the arrows 82 and 83, and the position relative to the first casing section 73 is shortened through the long hole portions 77a, 77b resulting in the approaching condition between the first and second casing sections 73 and 74 as shown in FIG. 15. The separating operation from the FIG. 15 condition is achieved by performing the reverse operation.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A recording/reproducing apparatus comprising tape winding means describing a locus of movement for rotationally moving around a tape guide drum and for pulling out a tape from a tape cassette and winding the pulled-out tape around said tape guide drum, said recording/reproducing apparatus having a movable casing section member which moves from a position remotely located relative to the locus of the rotational movement of said tape winding means to a position entering into the locus of movement after said tape winding means is rotationally moved through a predetermined angle.

2. A recording/reproducing apparatus as claimed in claim 1, wherein said tape winding means is rotationally moved in response to the advancing movement of said tape guide drum; said tape guide drum being located at a side opposite to said tape cassette; said tape being stretched by a pair of posts of said tape cassette as said tape enters into an aperture section of said tape cassette, and said casing section entering into the locus of the rotational movement of said tape winding means on approach to said tape guide drum after said tape winding means is rotationally moved by a predetermined angle.

3. A recording/reproducing apparatus as claimed in claim 1, wherein said tape guide drum is located at the side opposite to said tape cassette with respect to the tape and stretched by a pair of posts of said tape cassette, and said casing section entering into the locus of the rotational movement of said tape winding means after said tape winding means is rotationally moved by a predetermined angle around said tape guide drum.

4. A recording/reproducing apparatus as claimed in claim 1, wherein said tape winding means is arranged such that the longitudinal direction of the tape passing between said tape guide drum and said casing section and is in a tape path such that the tape wound on said tape guide drum by said tape winding means leads to said tape cassette, and is substantially parallel to an envelope formed by said casing section.

5. A recording/reproducing apparatus as claimed in claim 1, wherein said tape winding means includes a rotating ring and a tape pulling-out member rotationally moving around said tape guide drum, the radius of said rotating ring of the portion facing said casing section after said tape pulling-out member is rotationally moved by a predetermined angle, being smaller than the maximum radius of the locus of the rotational movement of said tape pulling-out member.

6. A recording/reproducing apparatus as claimed in claim 1, further including a cassette mounting section for mounting said tape cassette, a drum mounting section for mounting said tape guide drum, a first casing section coupled to said cassette mounting section, and a second casing section coupled to said drum mounting section, and wherein the approaching movement between said first and second casing sections is terminated after the approaching movement between said cassette mounting section and said drum mounting section and the separating movement between said first and second casing sections is started prior to the separating movement between said cassette mounting section and said drum mounting section.

7. A recording/reproducing apparatus as claimed in claim 1, further comprising:
   a cassette mounting section for mounting a tape cassette; a drum mounting section for mounting a tape guide drum; mounting section guide means for guiding the approaching and separating directions in terms of said cassette mounting section and said drum mounting section; a first casing section provided in correspondance with said cassette mounting section; a second casing section provided in correspondance with said drum mounting section; casing section guide means for performing the guide so that the approach and separation between said first and second casing sections are performed in directions substantially equal to the guiding directions of said mounting section guide means; and engaging means for performing engagement between said cassette mounting section or said drum mounting section and said first casing section or said second casing section mainly in the approaching and separating directions between said drum mounting section and said cassette mounting section.

8. A recording/reproducing apparatus as claimed in claim 7, further comprising driving power transmitting means for transmitting a driving, power through an engaging means so that the approaching movement between said first and second casing sections is terminated after the approaching movement between said cassette mounting section and said drum mounting section and the separating movement between said first and second casing sections is started prior to the separating movement between said cassette mounting section and said drum mounting section, and a drive source for supplying the driving power to said driving power transmitting means.

9. A recording/reproducing apparatus as claimed in claim 1, further comprising:
a cassette mounting section for mounting a tape cassette; a drum mounting section for mounting a tape guide drum; mounting section guide means for guiding the approaching and separating directions in terms of said cassette mounting section and said drum mounting section; a first casing section provided in correspondance with said cassette mounting section; a second casing section provided in correspondance with said drum mounting section; casing section guide means for performing the guide so that the approach and separation between said first and second casing sections are performed in directions substantially equal to the guiding directions of said mounting section guide means; engaging means for performing engagement between said cassette mounting section or said drum mounting section and said first casing section or said second casing section mainly in the approaching and separating directions between said drum mounting section and said cassette mounting section; and movement amount transmitting means supported by either of said first and second casing sections and for transmitting a relative moving amount of said first and second casing sections at a position of one extension substantially perpendicular to the guiding direction of said casing section guide means to a position of the other extension.

10. A recording/reproducing apparatus as claimed in claim 9, wherein said movement amount transmitting means comprises a plurality of rotating bodies rotated so that they become engaged with each other in a plane parallel to the bottom surface of said tape cassette.

* * * * *